United States Patent [19]

Sharki

[11] 3,929,014

[45] Dec. 30, 1975

[54] PERIODICALLY ACTUATED PNEUMATIC RATEMETER

[75] Inventor: Martin James Sharki, Houston, Tex.

[73] Assignee: Dresser Industries, Inc., Dallas, Tex.

[22] Filed: Dec. 30, 1974

[21] Appl. No.: 537,627

Related U.S. Application Data

[63] Continuation-in-part of Ser. No. 442,027, Feb. 13, 1974, abandoned.

[52] U.S. Cl. ................................................. 73/168
[51] Int. Cl.² ........................................... G01M 19/00
[58] Field of Search.. 73/168; 235/201 ME, 200 PF, 235/201 R, 201 PF

[56] References Cited
UNITED STATES PATENTS
3,716,707  2/1973  Sharki et al ......................... 235/200

*Primary Examiner*—Richard C. Queisser
*Assistant Examiner*—Marcus S. Rasco
*Attorney, Agent, or Firm*—Eddie E. Scott

[57] ABSTRACT

The pumping rate of an oil well pump or other recurring event may be determined by monitoring air impulses on a line wherein the air impulses correspond to the pump strokes. Fluidic logic circuitry removes a predetermined sequence of periodic impulses from the line. The remaining impulses are transmitted to a switching means that alternately connects a first tank with a second tank and the first and second tanks with an outlet orifice in a first position and connects a constant pressure source with the first tank and the second tank with a pressure gauge in a second position.

Air impulses representing a recurring event may be transmitted over a long line to allow a processing means to be located remotely from the means detecting the recurring event. A restrictor is provided proximate the end of the line remote from the means detecting the recurring event to provide pressure reduction to that end of the line.

28 Claims, 2 Drawing Figures

3,929,014

PERIODICALLY ACTUATED PNEUMATIC RATEMETER

REFERENCE TO RELATED APPLICATION

This is a continuation-in-part of application Ser. No. 442,027 filed Feb. 13, 1974, now abandoned.

BACKGROUND OF THE INVENTION

The present invention relates to the measurement of the rate of recurring a event. In a preferred embodiment of the invention, fluidic components are used to monitor impulses corresponding to pump strokes in oil well equipment and determine the rate of such impulses. The present invention also relates to the transmission of air impulses over a long line.

In the art of drilling oil and gas wells, it is well known to measure the total number of certain reoccuring events, such as the revolutions of the drill pipe, the depth increments of the drill pipe, the number of strokes of a mud pump and the like. It has also been recognized by those in the art that it is desirable to know the instantaneous rate at which such variables occur. For example, U.S. Pat. No. 3,541,852 to J. H. Brown et al., patented Nov. 24, 1970, describes an electronic system for monitoring drilling conditions relating to oil and gas wells. It should be recognized, however, that under certain drilling conditions it is highly desirable to use a pneumatic system instead of an electrical system in order to lessen the possibility of an explosion at the drill site. By way of further example, there have been systems proposed in the art involving pneumatic counting and rate measuring devices such as are disclosed in U.S. Pat. No. 3,348,231 issued Oct. 17, 1967, and U.S. Pat. No. 3,716,707 to Martin J. Sharki et al., patented Feb. 13, 1973.

The prior art pneumatic ratemeter devices have not performed as effectively as desired. The one-shot type ratemeter devices have encountered difficulties because the timing of the various one-shot components is imperfect. The basic problem encountered with pneumatic ratemeter devices is that a single reoccurring signal must be used to accomplish three functions. The first function is to charge a timing tank. The second function is to dump the timing tank at a predetermined rate and the third function is to indicate the pressure remaining in the timing tank. The present invention provides a pneumatic ratemeter apparatus that will effectively accomplish the three functions without the use of one-shot components.

Problems have been encountered in attempting to transmit air impulses over a long length of line. Generally, the pressure in the entire line must be bled off before the next impulse can be applied to the line. As the length of line increases the time required for the pressure to be bled off increases. This limits the rate of impulses that can be transmitted over a long line. For example, the approximate maximum length of line for transmitting impulses at the rate of 200 impulses per minute is 15 feet. It is desirable to use much longer lines in many instances. The impulse processing equipment may need to be located remotely from the equipment applying the impulses to the line.

DESCRIPTION OF PRIOR ART

In U.S. Pat. No. 3,541,852 to J. H. Brown et al., patented Nov. 24, 1970, an electronic system for monitoring drilling conditions relating to oil and gas wells is shown. An electronic system self-contained within a skid or trailer-mounted console provides a completely new set of well statistics once each minute or once each foot, thus giving the drilling operator a continuous picture of drilling conditions. Information recorded by the system includes drilling depth, time, penetration rate, hook load, rotary speed, pump strokes, gas chromatography, and such drilling mud information as weight-in, weight-out, viscosity and temperature and flow rates. A drilling mud pit volume totalizer sub-system includes means for monitoring the mud volume in each of a series of drilling mud pits, means for adding the individual volumes to monitor the total mud volume in the system and also means to include the residual drilling mud located beneath the mud level sensors within the total mud volume. Also included within the system is mechanical apparatus and associated electronics for monitoring the true depth and rate of penetration of the drill bit and associated drill pipe and also the speed of rotation of the drill bit.

In U.S. Pat. No. 3,716,707 to M. J. Sharki et al., patented Feb. 13, 1973, a pneumatic ratemeter and counter is shown. A one-shot sensor valve receives a mechanical force from pump rod movement and operates to pressurize a one-shot air tank from a regulated air supply. When the pump rod moves back to its original position, the one-shot tank is discharged into fluidic logic circuitry which energizes a counter and passes the air signal to a ratemeter transfer valve and through a one-shot storage valve. The one-shot storage valve stores air pressure in a second one-shot air tank and a time air tank receives compressed air at a constant and predetermined rate from a flowrater through the ratemeter transfer valve. When the transfer valve is energized, the pressure in the time tank is transferred through a booster relay to a readout device. As the signals are coupled from the counter to the ratemeter, the second one-shot air tank is released into a dump pilot valve operator and a dump valve to discharge the time air tank. In the time between the dumping of the time tank and its transfer into the readout device, the time tank is building pressure at a set rate determined by the flowrater. The time between pulses is then represented by a pressure buildup in the time tank. In an alternative embodiment, the flowrater is replaced with a timing motor which drives a timing disc having a hole therethrough which causes air to be passed alternately through a pair of air switches which respectively cause an air volume tank to be pressured up and dumped at a rate commensurate with the rotation of the disc. Based upon the principle that when a given volume of air at a given pressure is allowed to expand into a second volume on a timed cycle, the resultant pressure at any time is a measure of the time from the first cycle to the time of measurement, the pressure in the air timing tank at any time is thus a function of the rate of pulses generated by the one-shot sensor valve or by the mechanical force that causes the one-shot sensor valve to operate.

SUMMARY OF THE INVENTION

The present invention provides an apparatus for monitoring the rate of air impulses in an air line. The present invention also allows air impulses to be transmitted over a long length of line. The apparatus may be used to determine the rate of pump strokes of oil well equipment or to determine the rate of other recurring events. One embodiment of the invention includes means for providing air impulses to the line, a timing tank means, and pressure variation means for causing the pressure of air in the timing tank to vary at a predetermined rate. Means are provided for removing a predetermined sequence of periodic impulses from the line. A gating means is responsive to these impulses and acts to alternately connect the timing tank means to the pressure variation means and the timing tank to a display means. The above and other objects and advantages of the present invention will become apparent from a consideration of the following detailed description of the invention when taken in conjunction with the drawings.

DETAILED DESCRIPTION OF THE INVENTION

Figure 1:
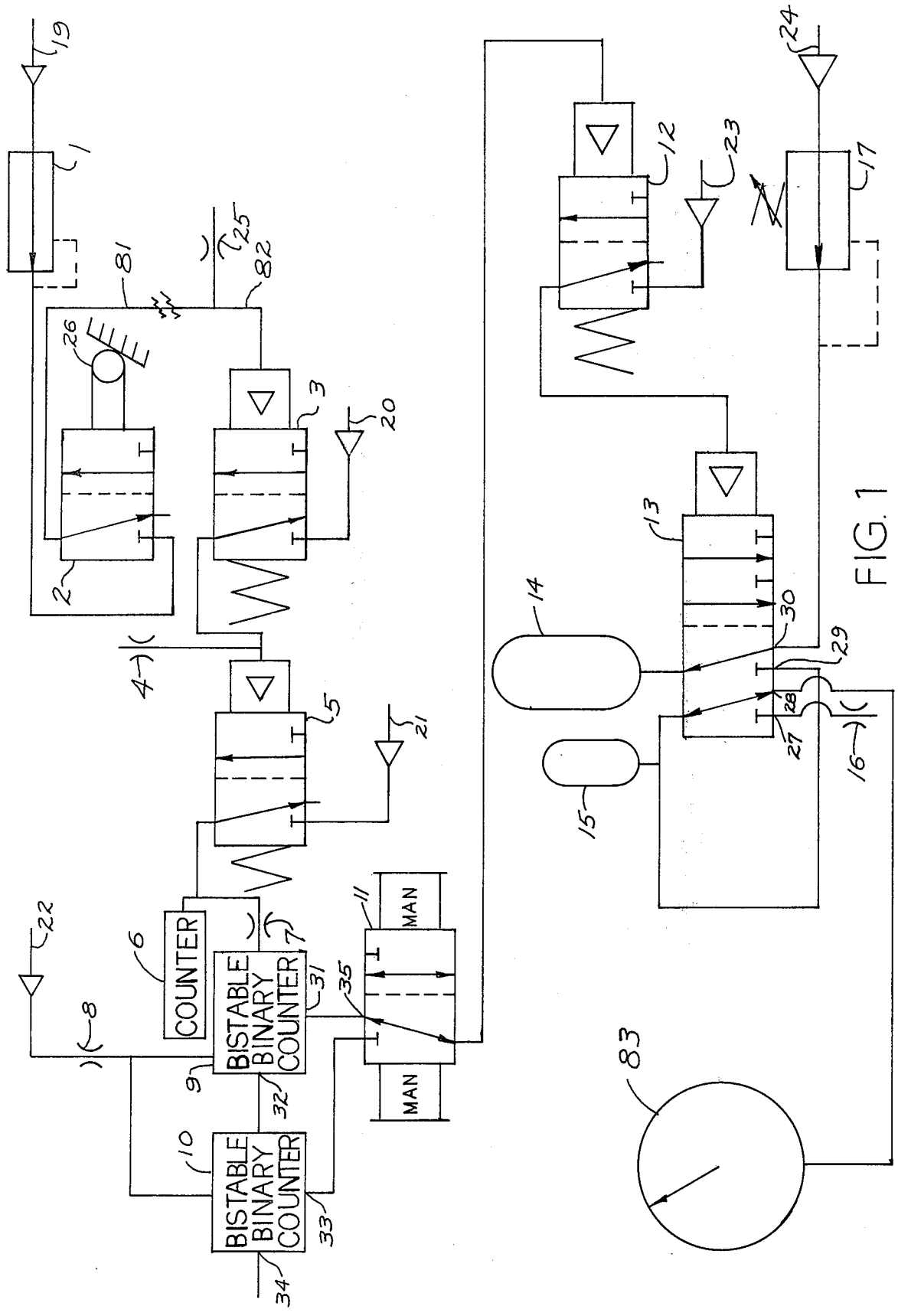
FIG. 1 is a schematic diagram of an apparatus constructed in accordance with the present invention, and illustrates the operation of the apparatus.

Referring now to FIG. 1, a pneumatic ratemeter apparatus constructed in accordance with the present invention is illustrated. Air is directed from a source 19 to a regulator 1. The regulator 1 is connected to a limit valve 2. A pump rod contacts the actuator 26 of limit valve 2 on every stroke of the pump. The limit valve 2 is connected to an interface valve 3 by a line 81. Line 81 extends a substantial length to allow air impulses to be transmitted to a remote location. A restrictor 25 is connected to the line 81 between limit valve 2 and interface valve 3, near the end 82 of line 81. An air source 20 is connected to the interface valve 3. An interface valve 5 is connected to interface valve 3. A restrictor 4 is connected to the line connecting interface valve 5 and interface valve 3. An air source 21 is connected to interface valve 5. A bistable binary counter 9 is connected to the interface valve 5 through a pressure reducing restrictor 7. A pneumatic counter 6 is connected to the line connecting interface valve 5 and bistable binary counter 9.

The pneumatic counter 6 is conventional and, for example, may be a pneumatic counter available from Fluidonics, a division of Imperial-Eastman Corporation, 6300 West Howard St., Chicago, Ill., 60648, catalog number 300168, form 6029. A bistable binary counter 10 is connected to the bistable binary counter 9. The bistable binary counters 9 and 10 are conventional and, for example, may be bistable devices available from Fluidonics, a division of Imperial-Eastman Corporation, 6300 West Howard St., Chicago, Ill., 60648, catalog number 300093, form 6023.

An air source 22 is connected to bistable binary counters 9 and 10 through a restrictor 8. The bistable binary counters 9 and 10 are connected to a manually actuated range switch 11. The range switch 11 is connected to an interface valve 12. An air source 23 is connected to interface valve 12. A gating valve 13 is connected to interface valve 12. A large volume timing tank 14, a small volume timing tank 15, a pressure gauge 18, a restrictor 16 and a regulator 17 are connected to the gating valve 13. An air source 24 is connected to the regulator 17.

The structural details of an apparatus constructed in accordance with the present invitation having been described, the operation of the apparatus will now be considered with reference to FIG. 1. The apparatus has two stable states: one state which prepressures the large tank and reads the second tank and the other which provides a controlled bleed-down for both volume tanks.

The pump rod contacts the actuator 26 of limit valve 2 on every stroke of the pump. This causes the limit valve 2 to move from the initial position shown in FIG. 1 to its alternate position wherein air pressure from regulator 1 reaches interface valve 3 over line 81. Since line 81 is long, for example 200 feet, it would require a substantial period of time to bleed off through limit valve 2. A second impulse could not be applied to line 81 until the pressure has bled off or at least the pressure at end 82 has been reduced sufficiently to allow interface valve 3 to return to its normal state. By positioning restrictor 25 near the end 82 of line 81 the pressure at end 82 can be bled off in a relatively short period of time and a new impulse applied to line 81. It is interesting to note that the pressure near the entire length of line 81 may not be reduced appreciably but that only the pressure near end 82 and the pressure near the end connected to limit valve 2 are materially reduced between air impulses. The next actuation of limit valve 2 will raise the pressure in line 81 near the end connected to limit valve 2 and through line 81 to the end 82 to transmit the desired impulse to interface valve 3. It has been noted that the impulse at end 82 is a low pressure signal compared to the signal applied by limit valve 2; however, the low pressure signal is sufficient to actuate interface valve 3.

The low pressure signal actuates interface valve 3 and interface valve 3 actuates interface valve 5. The interface valves 3 and 5 allow a low pressure signal to be amplified and the restriction 25 allows the air impulses to be transmitted over a substantial distance. The restrictors 25 and 4 allow the pressure in the line to bleed down quickly thereby allowing the apparatus to cycle at a rapid rate. The interface valve 3 may be replaced by a conventional diaphragm amplifier. The diaphragm amplifier is a very low signal device and actuation is accomplished with as little as 0.3 of an inch of water column signal. The restrictor 25 would allow the pressure in the 200-foot line to bleed down quickly when the limit valve 2 is off and would relieve pressure in the 200-foot line. The combination of low actuating pressure and fast pressure relief would allow the diaphragm amplifier to cycle at the rate of 200 pulses per minute over a 200-foot line.

The output of interface valve 5 actuates the pneumatic counter 6 to give the total number of pump strokes. The output of interface valve 5 also changes the state of the bistable binary counter 9. The bistable binary counter 9 has two output ports 31 and 32. Every time a signal is received by the bistable binary counter 9, the output signal pressure is switched from one output port to the other. Thus, every time the pump rod contacts the actuator 26 of limit valve 2, the bistable binary counter 9 switches between output port 31 and output port 32. If range switch 11 is connected through port 35 to port 31 to receive the output signal from bistable binary counter 9, interface valve 12 will be actuated every other time limit valve 2 closes.

The output port 32 of bistable binary counter 9 is connected to bistable binary counter 10. Bistable binary counter 10 has two output ports 33 and 34. Every time a signal is received by the bistable binary counter 10, the output signal pressure is switched from output port 33 to output port 34. If range switch 11 is connected through port 36 to port 33 of bistable binary counter 10, interface valve 12 will be actuated every fourth time limit valve 2 closes.

Interface valve 12 amplifies the signal from range switch 11 and transmits the signal to gating valve 13. When, as shown in FIG. 1, there is no pilot pressure imposed on gating valve 13 (neutral position), the large volume timing tank 14 is connected to the calibration regulator 17 and is charged to a preset pressure. Simultaneously, the small volume timing tank 15 is connected to a read-out gauge 18 which indicates the pressure left in the small volume timing tank 15. When, as shown in FIG. 1, pilot pressure from interface valve 12 is imposed on gating valve 13, the large volume timing tank 14 is connected with the small volume timing tank 15 and the restrictor 16. The preset pressure bleeds down through the restrictor with time. When the pilot pressure is removed from gating valve 13, the pressure remaining in the small volume timing tank 15 is a function of the time between alternate pairs of signals to interface valve 12. With the range switch 11 in the position shown in FIG. 1, every second time limit valve 2 closes, the interface valve 12 will be actuated and gating valve 13 will move to the actuated position.

On the alternate pump strokes, the gating valve 13 will return to the neutral position because bistable binary counter 9 will be diverting air pressure through port 32 to bistable binary counter 10. Therefore, the length of time that timing tanks 14 and 15 are connected to the restrictor 16 is the length of time between two successive pump strokes. The pressure remaining on timing tank 15 at the end of said length of time is indicated on one scale of pressure gauge 83 and is a function of the time between two successive pump strokes. If the pumping rate is too fast for an adequate dual volume bleed-down time the range switch 11 may be moved to the alternate position to transmit a signal every fourth pump stroke and the time for the dual volume bleed-down state will be doubled, and the rate will be indicated on the second scale of pressure gauge 83.

The restrictor 16 in FIG. 1 is shown as a fixed flow restrictor. The system is calibrated by adjusting the presssure regulator 17. Alternatively the restrictor 16 could be an adjustable restrictor that would provide an adjustable flow. This would allow calibration of the system to the display means by adjustment of the restrictor.

Figure 2:
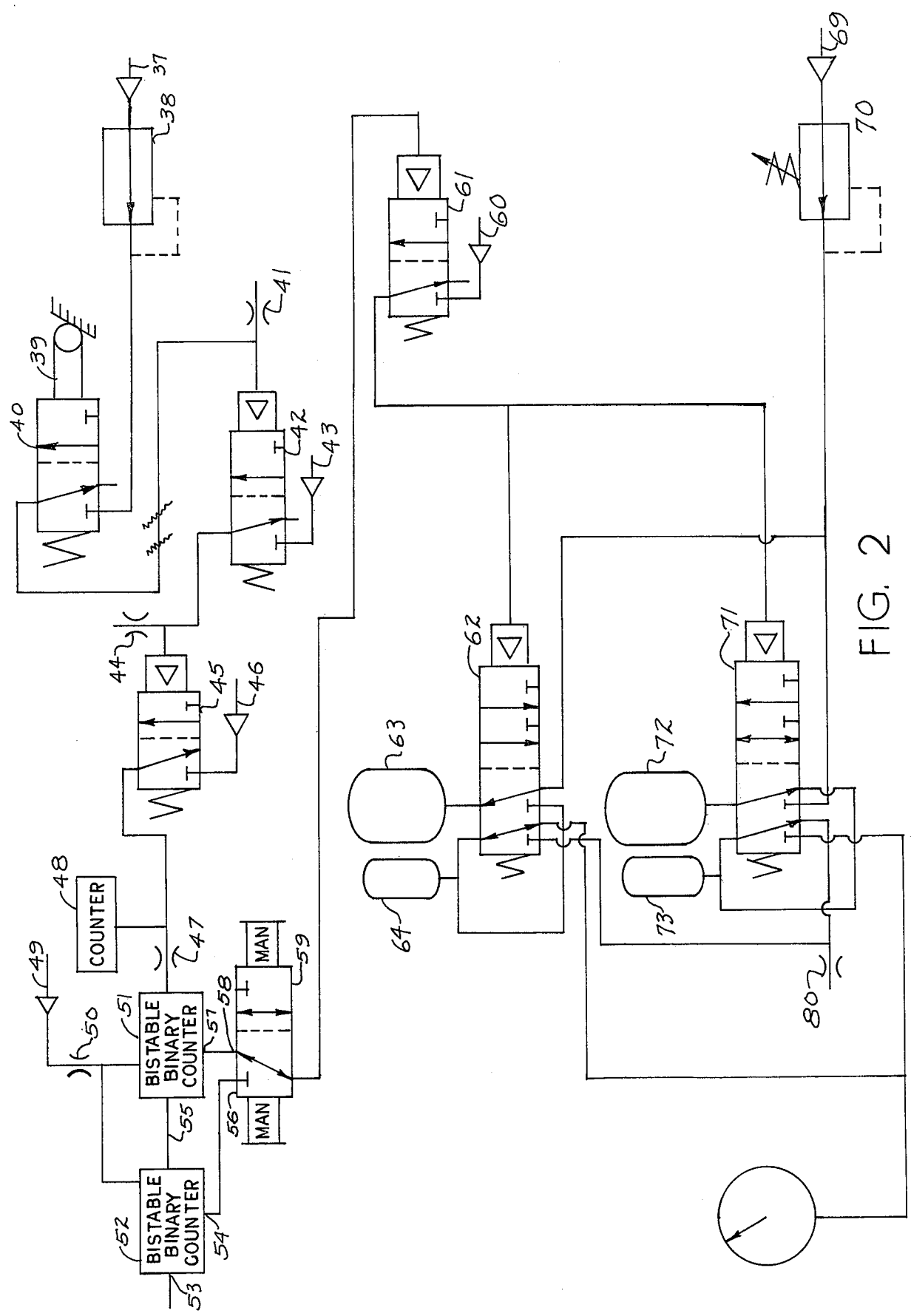
FIG. 2 is a schematic diagram of a second embodiment of the present invention.

Referring now to FIG. 2, a second embodiment of a pneumatic ratemeter apparatus constructed in accordance with the present invention is illustrated. Air is directed from a source 37 to a regulator 38. The regulator 38 is connected to a limit valve 40. A pump rod contacts the actuator 39 of limit valve 40 on every stroke of the pump. The limit valve 40 is connected to an interface valve 42. A restrictor 41 is connected to the line between limit valve 40 and interface valve 42 at a point near interface valve 42. An air source 43 is connected to the interface valve 42. An interface valve 45 is connected to interface valve 42. A restrictor 44 is connected to the line connecting interface valve 45 and interface valve 42. An air source 46 is connected to interface valve 45. A bistable binary counter 51 is connected to the interface valve 45 through a pressure reducing restrictor 47. A pneumatic counter 48 is connected to the line connecting interface valve 45 and bistable binary counter 51.

The pneumatic counter 48 is conventional, and for example, may be a pneumatic counter available from Fluidonics, a division of Imperial-Eastman Corporation, 6300 West Howard St., Chicago, Ill., 60648, catalog number 300168, form 6029. A bistable binary counter 52 is connected to the bistable binary counter 51. The bistable binary counters 51 and 52 are conventional, and for example, may be bistable devices available from Fluidonics, a division of Imperial-Eastman Corporation, 6300 West Howard St., Chicago, Ill. 60648, catalog number 300093, form 6023.

An air source 49 is connected to the bistable binary counters 51 and 52 through a restrictor 50. The bistable binary The bistable binary counters 51 and 52 are connected to a manually actuated range switch 59. The range switch 59 is connected to an interface valve 61. An air source 60 is connected to interface valve 61. A pair of gating valves 62 and 71 are connected to interface valve 61. A large volume timing tank 63, a small timing tank 64, a pressure gauge 78, a restrictor 80, and a regulator 70 are connected to the gating valve 62. A large volume timing tank 72, a small volume timing tank 73, the pressure gauge 78, the restrictor 80, and the regulator 70 are connected to the gating valve 71. An air source 69 is connected to the regulator 70.

The structural details of a second embodiment of an apparatus constructed in accordance with the present invention having been described, the operation of the apparatus will now be considered with reference to FIG. 2. The second embodiment of the apparatus provides a reading on every stroke of the pump when the range switch 59 is connected to port 57 of the bistable binary counter 51.

The pump rod contacts the actuator 39 of limit valve 40 on every stroke of the pump. This causes the limit valve 40 to move to the alternate position shown in FIG. 2, wherein air pressure from regulator 38 reaches interface valve 42. This low pressure signal actuates interface valve 42 and interface valve 42 actuates interface valve 45. The interface valves 42 and 45 allow a low pressure signal to be amplified and transmitted over a length of line. The restrictors 41 and 44 allow the pressure in the line to bleed down quickly thereby allowing the apparatus to cycle at a rapid rate.

The output of interface valve 45 actuates the pneumatic counter 48 to give the total number of pump strokes. The output of interface valve 45 also changes the state of the bistable binary counter 51. The bistable binary counter 51 has two output ports 55 and 57. Every time a signal is received by the bistable binary counter 51, the output pressure is switched from one output port to the other. Thus, every time the pump rod contacts the actuator 39 of limit valve 40, the bistable binary counter 51 switches between output port 55 and output port 57. If range switch 59 is connected through port 58 to port 57 to receive the output signals from bistable binary counter 51, interface valve 61 will be actuated every second time limit valve 40 closes.

The output port 55 of bistable binary counter 51 is connected to bistable binary counter 52. Bistable binary counter 52 has two output ports 53 and 54. Every time a signal is received by the bistable binary counter 52, the output signal pressure is switched from output port 53 to output port 54. If the range switch 59 is connected through port 56 to port 54 of bistable binary counter 52, interface valve 61 will be actuated every fourth time limit valve 40 closes.

Interface valve 61 amplifies the signal from range switch 59 and transmits the signal to gating valves 62 and 71. When there is no pilot pressure imposed on gating valve 62 (neutral position), the large volume timing tank 63 is connected to the calibration regulator 70 and is charged to a preset pressure. In the neutral position, the gating switch 62 also connects the small volume timing tank 64 to a read-out gauge 78 which indicates the pressure in the small volume timing tank 64. Simultaneously when there is no pilot pressure imposed on gating valve 71 (neutral position) the large volume timing tank 72 is connected with the small volume timing tank 73 and large volume timing tank 72 bleeds down through the restrictor 80 with time and the pressure remaining will be a function of the time between two successive pump strokes.

When pilot pressure from interface valve 61 is imposed on gating valve 62, the large volume timing tank 63 is connected with the small volume timing tank and the restrictor 80. The preset pressure bleeds down through the restrictor 80 with time and the pressure remaining will be a function of the time between two successive pump strokes.

When pilot pressure from interface valve 61 is imposed on gating valve 62, the large volume timing tank 63 is connected with the small volume timing tank and the restrictor 80. The preset pressure bleeds down through the restrictor 80 with time and the pressure remaining will be a function of the time between two successive pump strokes. Simultaneously, when pilot pressure from interface valve 61 is imposed on gating valve 71, the large volume timing tank 72 is connected to the calibration regulator 70 and is charged to a preset pressure. Gating valve 71 also connects the small volume timing tank 73 to the pressure gauge 78 to indicate the pressure left in the small volume timing tank 73.

The restrictor 80 is shown as a fixed flow restrictor. The system is calibrated by adjusting the pressure regulator 70. Alternatively, the restrictor 80 could be an adjustable restrictor that would provide an adjustable flow. This would allow calibration of the system to the display means by adjustment of the restrictor.

The embodiment shown in FIG. 2 will provide a read out on one scale on pressure gauge 78 indicating the rate of pump strokes based on each two successive strokes. With range switch moved to its alternate position, the pressure on second scale on gauge 78 will indicate the rate of pump strokes based on each alternate pair of successive pump strokes.

I claim:

1. An apparatus for monitoring the rate of air impulses in an air line, comprising:
   a first timing tank for storing air;
   a second timing tank for storing air;
   outlet means for allowing air to escape from said first and second timing tanks at a predetermined rate;
   a pressure indicator;
   a constant pressure source;
   switching means responsive to impulses from said line for alternately connecting said first timing tank to said second timing tank and said first and second timing tanks to said outlet means in a first position and connecting said constant pressure source to said first timing tank and said second timing tank to said pressure indicator in a second position.

2. The apparatus of claim 1 wherein said first timing tank is larger than said second timing tank.

3. The apparatus of claim 2 wherein said first timing tank is at least twice as large as said second timing tank.

4. An apparatus for monitoring the rate of air impulses in an air line, comprising:
   a first tank for storing air;
   a second tank for storing air;
   outlet means for allowing air to escape from said first and second tank at a predetermined rate;
   a pressure indicator;
   a constant pressure source;
   means for removing periodic impulses from said line; and
   switching means responsive to said periodic impulses from said line for alternately connecting said first tank to said second tank and said first and second tank to said outlet means in a first position and connecting said constant pressure source to said first tank and said second tank to said pressure indicator in a second position.

5. The apparatus of claim 4 wherein said first tank is larger than said second tank.

6. The apparatus of claim 5 wherein said first tank is at least twice as large as said second tank.

7. A ratemeter apparatus for monitoring the rate of air impulses in a pneumatic air line, comprising:
   means providing said impulses to said line;
   first air storage tank means;
   second air storage tank means;
   means for causing the air pressure within said first and second storage tank means to vary at a predetermined rate;
   pressure responsive display means;
   means for removing periodic impulses from said line; and
   means responsive to the remaining impulses from said line for alternately connecting said means for causing the air pressure within said first and second air storage tank means to vary at a predetermined rate with said first and second air storage tank means, and alternately connecting said pressure responsive display means with said first and second air storage tank means.

8. An apparatus for monitoring the rate of air impulses in an air line, comprising:
   a first tank for storing air;
   a second tank for storing air;
   outlet means for allowing air to escape from said first and second tank at a predetermined rate;
   a pressure indicator;
   a constant pressure source;
   means for removing periodic impulses from said line;
   and switching means responsive to the remaining impulses from said line for alternately connecting said first tank with said second tank and said first and second tank with said outlet means in a first position and connecting said constant pressure source with said first tank and second tank with said pressure indicator in a second position.

9. An apparatus for monitoring the rate of air impulses, comprising:
   a line having a first end and a second end;
   an air source;
   valve means connected to said first end of said line between said line and said air source for applying air impulses to said line;
   restrictor means connected to said line near said second end of said line for allowing the pressure in said line near said second end to bleed off;
   a first timing tank for storing air;
   a second timing tank for storing air;

outlet means for allowing air to escape from said first and second timing tanks at a predetermined rate;
a pressure indicator;
a constant pressure source; and
switching means responsive to impulses from said second end of said line for alternately connecting said first timing tank to said second timing tank and said first and second timing tanks to said outlet means in a first position and connecting said constant pressure source to said first timing tank and said second timing tank to said pressure indicator in a second position.

10. The apparatus of claim 9 wherein said first tank is larger than said second tank.

11. The apparatus of claim 10 wherein said first tank is at least twice as large as said second tank.

12. An apparatus for monitoring the rate of air impulses in an air line, comprising:
a first large volume tank for storing air;
a first small volume tank for storing air;
outlet means for allowing air to escape at a predetermined rate;
a pressure indicator;
a constant volume source;
first switching means responsive to impulses from said line for alternately connecting said first large volume tank to said first small volume tank and said first large volume tank and said first small volume tank to said outlet means in a first position and connecting said constant volume source to said first large volume tank and said first small volume tank to said pressure indicator in a second position;
a second large volume tank for storing air;
a second small volume tank for storing air;
second switching means responsive to impulses from said line for alternately connecting said constant volume source to said second large volume tank and said second small volume tank to said pressure indicator in a first position and connecting said second large volume tank to said second small volume tank and said second large volume tank and said second small volume to said outlet means in a second position; and
means for removing impulses from said line.

13. An apparatus for monitoring the rate of air impulses in an air line, comprising:
tank means for storing air;
pressure variation means for causing the pressure of air in said tank to vary at a predetermined rate;
display means for indicating air pressure;
gating means responsive to impulses from said line for alternately connecting said tank means to said pressure variation means and said tank means to said display means; and
means for removing periodic impulses from said line.

14. The apparatus of claim 13 wherein said means for removing periodic impulses from said line removes at least every other impulse from said line.

15. The apparatus of claim 14 wherein said air storage tank means includes a first tank and a second tank.

16. The apparatus of claim 15 wherein said first tank is larger than said second tank.

17. The apparatus of claim 16 wherein said first tank is at least twice as large as said second tank.

18. A ratemeter apparatus for monitoring the rate of air impulses in a pneumatic air line, comprising:
air storage tank means;
means for causing the air pressure within said air storage tank means to vary at a predetermined rate;
pressure responsive display means;
means responsive to said impulses from said line for alternately connecting said means for causing the air pressure within said air storage tank to vary at a predetermined rate with said air storage tank means and said pressure responsive display means with said air storage tank means; and
means for removing periodic impulses from said line.

19. The ratemeter apparatus of claim 18 wherein said air storage tank means includes a first tank and a second tank.

20. The ratemeter apparatus of claim 19 wherein said first tank is larger than said second tank.

21. The ratemeter apparatus of claim 20 wherein said first tank is at least twice as large as said second tank.

22. An apparatus for monitoring the rate of air impulses in an air line, comprising:
a first tank for storing air;
a second tank for storing air;
outlet means for allowing air to escape from said first and second tank at a predetermined rate;
a pressure indicator;
a constant volume source;
switching means responsive to impulses from said line for alternately connecting said first tank to said second tank and said first and second tank to said outlet means in a first position and connecting said constant volume source to said first tank and said second tank to said pressure indicator in a second position; and
means for removing periodic impulses from said line.

23. The apparatus of claim 22 wherein said means for removing periodic impulses from said line removes at least every other impulse from said line.

24. The apparatus of claim 23 wherein said first tank is larger than said second tank.

25. The apparatus of claim 24 wherein said first tank is at least twice as large as said second tank.

26. An apparatus for monitoring the rate of air impulses in an air line, comprising:
a first large volume tank for storing air;
a first small volume tank for storing air;
outlet means for allowing air to escape at a predetermined rate;
a pressure indicator;
a constant volume source;
first switching means responsive to impulses from said line for alternately connecting said first large volume tank to said first small volume tank and said first large volume tank and said first small volume tank to said outlet means in a first position and connecting said constant volume source to said first large volume tank and said first small volume tank to said pressure indicator in a second position;
a second large volume tank for storing air;
a second small volume tank for storing air;
second switching means responsive to impulses from said line for alternately connecting said constant volume source to said second large volume tank and said second small volume tank to said pressure indicator in a first position and connecting said second large volume tank to said second small volume tank and said second large volume tank and said second small volume tank to said outlet means in a second position; and
means for removing impulses from said line.

27. A ratemeter apparatus for monitoring the rate of air impulses in a pneumatic air line, comprising:
   means providing said impulses to said line;
   air storage tank means;
   means for causing the air pressure within said air storage tank means to vary at a predetermined rate;
   pressure responsive display means;
   means for removing periodic impulses from said line; and
   means responsive to the remaining impulses from said line for alternately connecting said means for causing the air pressure within said air storage tank to vary at a predetermined rate with said air storage tank means and said pressure responsive display means with said air storage tank means.

28. An apparatus for monitoring the rate of air impulses in an air line, comprising:
   a first tank for storing air;
   a second tank for storing air;
   outlet means for allowing air to escape from said first and second tank at a predetermined rate;
   a pressure indicator;
   a constant volume source;
   means for removing periodic impulses from said line; and
   switching means responsive to the remaining impulses from said line for alternately connecting said first tank with said second tank and said first and second tank with said outlet means in a first position and connecting said constant volume source with said first tank and said second tank with said pressure indicator in a second position.

* * * * *